United States Patent [19]

Schulte

[11] 4,369,498

[45] Jan. 18, 1983

[54] PHOTOLUMINESCENT POWERED CALCULATOR

[75] Inventor: Eric F. Schulte, Richardson, Tex.

[73] Assignee: Texas Instruments Incorporated, Dallas, Tex.

[21] Appl. No.: 226,299

[22] Filed: Jan. 19, 1981

[51] Int. Cl.³ .............. G06F 15/02; H01L 31/04
[52] U.S. Cl. .................... 364/707; 136/247; 136/259; 136/291; 364/705; 368/205
[58] Field of Search .............. 136/247, 259, 291; 364/707, 705; 368/205

[56] References Cited

U.S. PATENT DOCUMENTS 4,190,465 2/1980 Boling .............................. 136/247
4,264,962 4/1981 Kodaira ........................... 364/707

FOREIGN PATENT DOCUMENTS 2824888 12/1979 Fed. Rep. of Germany ...... 136/247
437145 11/1967 Switzerland ....................... 136/291

OTHER PUBLICATIONS

*Elektor*, Jul./Aug. 1976, p. 732.
G. Keil, "Design Principles of Fluorescence Radiation Converters", *Nuclear Instruments & Methods*, vol. 89, pp. 111-123 (1970).

*Primary Examiner*—Aaron Weisstuch
*Attorney, Agent, or Firm*—Melvin Sharp; Leo N. Heiting; Robert D. Marshall, Jr.

[57] ABSTRACT

A photoluminescent dye is suspended in a transparent medium. When exposed to light, the dye re-emits light in a narrow frequency range. Photovoltaic cells responsive to the re-emitted light are arranged around the sides of the collector medium, and are electrically connected to a low power demand device, such as a calculator. A reflective surface is placed next to the collector medium and kept a slight distance away such that an air gap is formed between the collector and the reflective surface. This gap increases the efficiency of the collector to the point that the collector will operate a small calculator even though exposed to low light levels such as are normal in an office environment.

8 Claims, 4 Drawing Figures

PHOTOLUMINESCENT POWERED CALCULATOR

BACKGROUND OF THE INVENTION

The use of ambient light to power a low power demand device has been approached in several ways. One method utilizes a large photovoltaic array approximately 16 cm² to charge batteries. Another approach uses no batteries, but requires a similarly large array area to provide sufficient electric power, on the order of 10 cm² of photovoltaic cells.

A compounding problem exists in an office or home environment where the light levels are lower than those which are found outdoors in direct sunlight. This requires a large surface area to be exposed to the lower lighting levels, or an increase in efficiency of the power converting cells.

One method proposed to increase efficiency utilizes a planar luminescent greenhouse collector. See: J. A. Levitt and W. H. Weber, Applied Optics, Vol. 16, No. 10, October 1977. A solid sheet of glass or plastic is infused with a luminescent dye. When the dye is exposed to light, the dye re-emits a particular frequency of light. This light is trapped within the solid by polished surfaces of the solid. Photovoltaic cells are optically coupled to faces and are designed to be particularly responsive to the light frequency emitted by the dye. Thus, the effect is a collection of the ambient light, and a concentration of the light at the desired wavelength for maximum conversion into electric power. This procedure, however, still does not attain the efficiency levels required for a small collector surface area coupled with a low light level such as is found in an office environment.

Accordingly, an object of the present invention is to increase the light collector efficiency to the point that an electronic device such as a calculator can be powered by a small surface area collector, without batteries, and be operable in a low light environment such as an office, while requiring 1.3 cm² of photovoltaic area or less, and thus reduce costs considerably.

SUMMARY AND BRIEF DESCRIPTION OF THE INVENTION

One aspect of this invention relates to a photoluminescent light collector and concentrator. A reflective face is located near the surfaces of a transparent or translucent medium, such as plastic or glass. The medium has an infusion of photoluminescent material, said material being responsive to light frequencies normally found in an office or home environment. The reflective face is usually located within 5 mm of the surface, preferably at 1 mm or less, but not optically in contact therewith. The gap between the collector medium and the reflective face is maintained as an air gap for enhanced light retention within the structure. A reflective surface found to work well was a tray formed of white cardboard. The plastic or glass collector medium rests directly upon the surface of the paper; however, the two surfaces are not optically connected. The surface of the cardboard is rough relative to the polished surface of the collector. This roughness is sufficient to maintain a very slight gap between the surfaces over most of the surface area even though the collector is in contact with the reflector at some points. A-light-to electricity converting means such as one or several photovoltaic cells are optically coupled to the collector medium and are particularly sensitive to the light frequency of the output of the luminescent infusion.

The reflective surface has any light color, or is a mirror surface, but white has the highest reflectivity of diffused light and is the most efficient in tests of the air gap reflective structure.

In accordance with another aspect of the invention, the entire collection and converting structure is mounted upon a wallet type folder or directly upon an electronic device such as a calculator or clock. With respect to the calculator, the folder operates to turn the device on when opened and exposed to light and off when closed. A sliding track opening and closing the device will also work.

A planar configured collector and concentrator as in the present invention will operate a small electronic device with a power demand of 0.1 mw or less in a low light environment, yet requires 1.3 cm² of photovoltaic cell surface, does not require batteries or on/off switch, and thus the cost is greatly reduced. This invention can be used with batteries for charging or supplementing power or for continuous operation as a clock requires, or a calculator with continuously powered memory. Additionally, this invention can be used in large arrays for commercial production of power or for power augmentation systems for homes or businesses at cost reductions of 30% or more due to the lessened requirement for photovoltaic cell area.

DETAILED DESCRIPTION OF THE DRAWINGS

Figure 1:
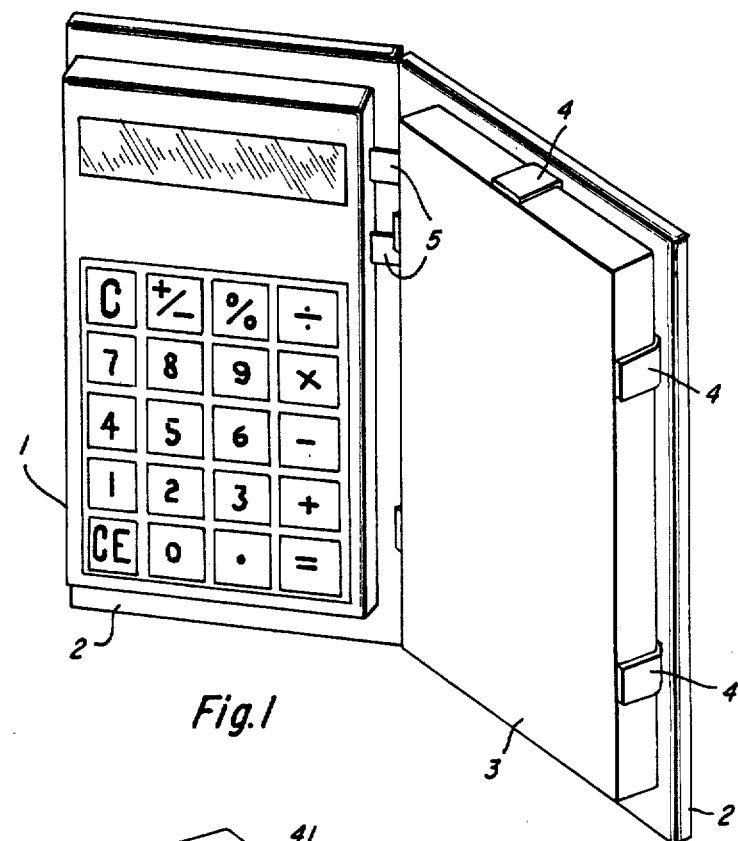
FIG. 1 is a perspective view of one embodiment of the invention shown in conjunction with an electronic calculator.

Referring to FIG. 1, calculator 1 is attached to the folder 2 by any known means. The planar luminescent collector 3, is held in place by clip 4; however, adhesives or plastic straps are useful as long as the attachment means does not restrict light entry into the large plane area of the collector. Any such light restriction will tend to degrade performance of the collector concentrator structure 3.

Connectors 5 are electrically conductive and constructed of wire or plastic such that they are readily bent and straightened repeatedly without damage when the folder is opened and closed.

Figure 2:
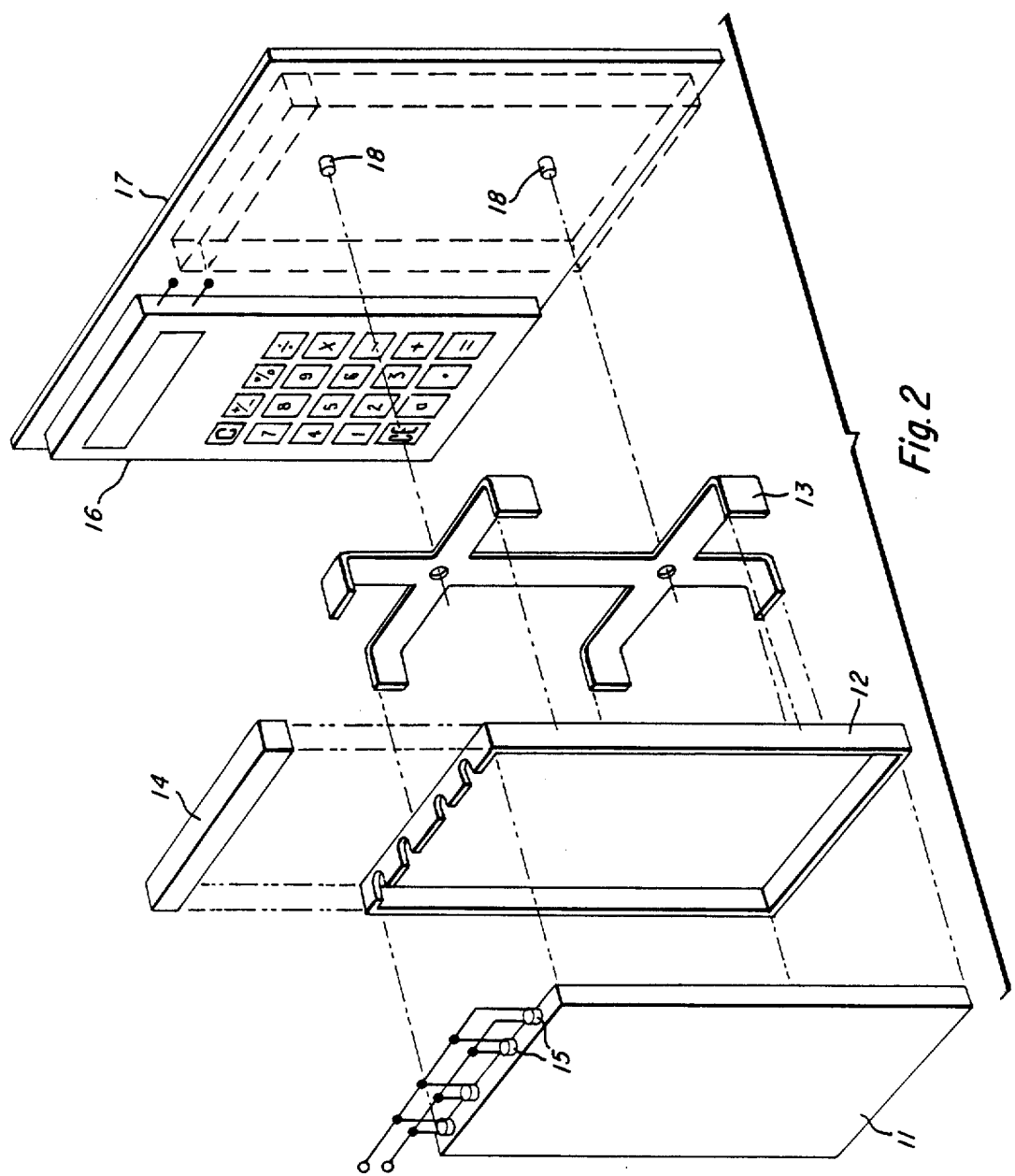
FIG. 2 is a plan view of an alternative embodiment of the present invention shown with the respective parts separated for clarity.

Referring now to FIG. 2, the collector 11, is shown as a solid such as plastic or glass. Liquids are also useful as collector mediums; however, a solid is less expensive to use primarily because the handling required is less complex in a manufacturing environment; there is no chance for leakage or for bubbles to occur; and the proper distribution of luminescent dye is not a problem subsequent to the manufacturing of the solid collector medium.

The collector used was a salmon colored plastic sheet 2.3 in. × 4.0 in. × 60 mils in size, with a Rhodamine 6 G dye infusion. The selection of collector medium and photovoltaic materials is governed by formulas known to those skilled in the prior art. The Levitt and Weber article cited above gives these formulas and design considerations and is incorporated herein by reference. The collector medium and photovoltaic cell material are readily available from several manufacturers. The embodiment shown in FIG. 2 utilized a plastic collector cut from a salmon colored drafting triangle. All surfaces were highly polished in a conventional manner.

The reflective surface 12 was formed as a white cardboard tray. An air gap is maintained between the reflective tray and the collector by the normal rough surface on the inside of the tray and by preventing any wetting to occur between the two surfaces. Should the surfaces become optically coupled, performance is degraded. While a mirrored surface or other light colors such as yellow is useful, the white cardboard surface was found to have the highest efficiency. The photovoltaic cells 15 were optically intimate with the surface of the collector. This is accomplished by using a clear adhesive or by wetting the two surfaces with a non-evaporative liquid and then clamping the cells to the edge. Cover 14 is a protective shield for the photovoltaic cells and can be designed to clamp the cells to the edge. Clip 13, was attached to folder 17 by rivets 18, and holds the collector-concentrating structure firmly in place. Other attachment means such as adhesives work as well; however, adhesives should not be used to hold the collector medium 11 to the reflective surface 12 due to the surface wetting and consequent performance degradation. Alternative clip or strap means may be used, however.

The calculator 16 is attached to folder 17 in a known manner and the assembly is completed. No batteries are necessary and the on/off function is performed by opening the folder to expose surface 11 to ambient light, or by closing the folder. Light levels as low as 0.1 mw/cm$^2$ were found to operate a Texas Instruments Model 1030 calculator.

Figure 3:
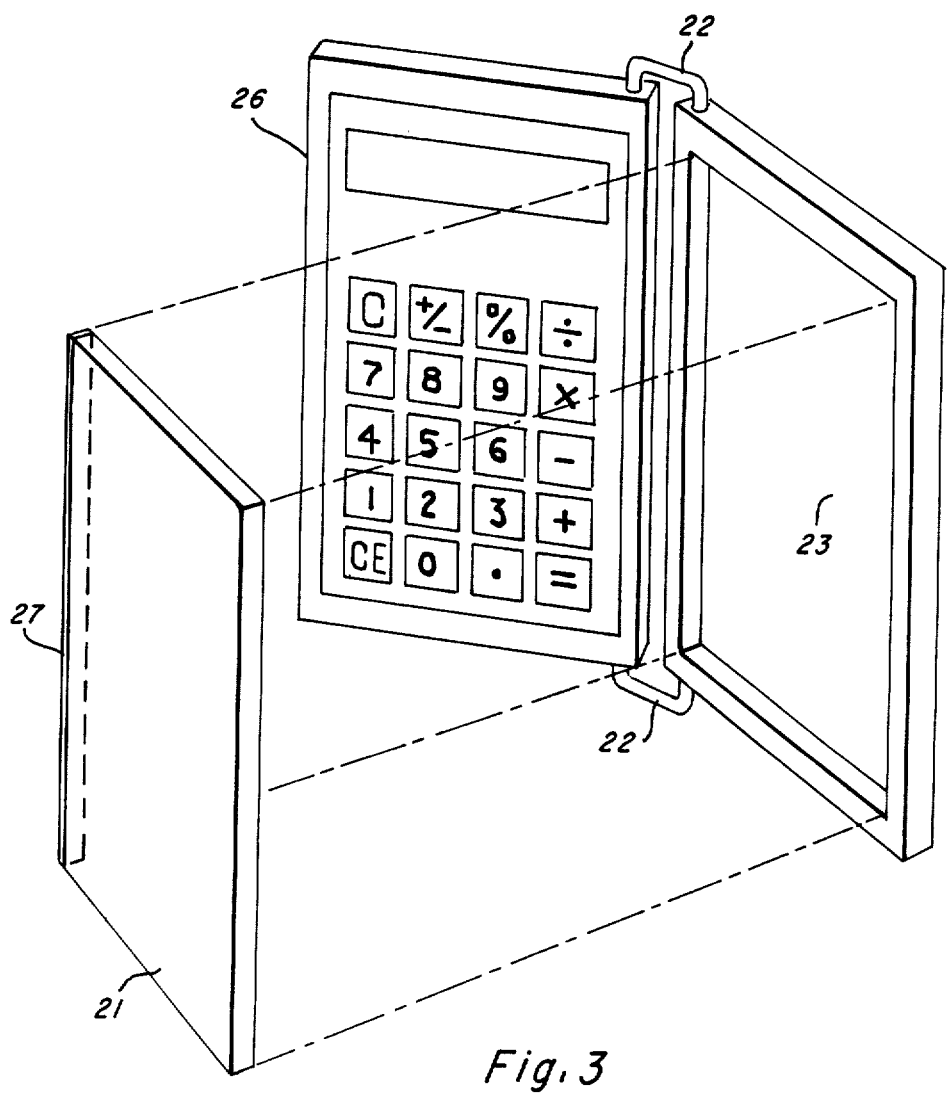
FIG. 3 is a plan view of a preferred embodiment of the present invention shown with the respective parts separated for clairty.

Referring now to FIG. 3, a photovoltaic cell 27 is attached to collector medium 21 in an optically coupled manner such as a clear adhesive and is electrically connected to calculator 26 by metal hinge means 22. A reflective surface 23 is placed such that it is not in optical intimacy with collector 21, and that an air gap is maintained between the two structures. A white cardboard tray cut from common white cardboard was used and the rough surface maintains a sufficient distance of 1 mm or less, if no wetting is allowed between the structures. Light colors other than white are useful or a silvered surface; however, white was found to be optimum for electric power output.

Alternative means of attachment and interconnection may be used without degrading performance if the light entry into collector 21 is not significantly reduced and if the reflective surface 23 is maintained at some distance from collector 21 on the order of 5 mm or less. The assembly was found to operate satisfactorily in an ambient light of 0.1 mw/cm$^2$ intensity using a Texas Instruments Model 1030 calculator.

Figure 4:
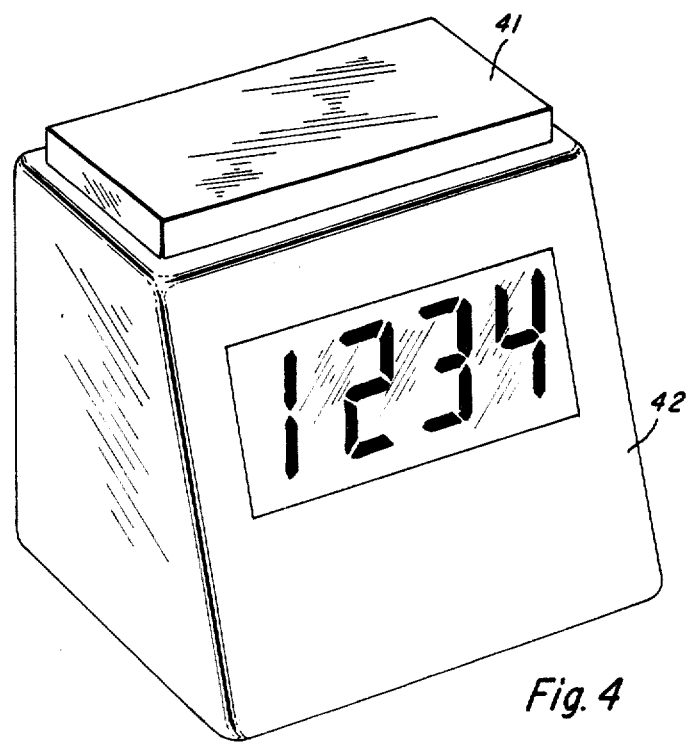
FIG. 4 is a perspective view of an alternative embodiment of the present invention shown in conjunction with an electronic clock.

Referring now to FIG. 4, collector-concentrator 41 is attached to the top side of a clock 42. The embodiment shown is a desk model for office or home use and will require batteries to maintain electronic function when the light is removed, such as at night when the overhead lights of an office are turned off. Wall mounted clocks are also possible.

Although preferred embodiments of the invention have been illustrated in the drawings and described in the foregoing specification, it will be understood that the invention is not limited to the embodiments disclosed, but is capable of rearrangement, modification, and substitution of parts and elements without departing from the spirit of the invention.

What is claimed is:

1. An apparatus comprising:
   a. a photoluminescent collector having opposed, substantially parallel first and second main surfaces bounded by at least one edge surface;
   b. a photovoltaic cell for generating electric power optically coupled to said edge surface of said collector;
   c. a reflective face located in contact with said first main surface of said collector but separated therefrom by the normal roughness of said face to provide an air gap;
   d. means for receiving said electric power; and
   e. means for mounting and electrical interconnection of said apparatus.

2. A light collector and concentrator comprising:
   a. a photoluminescent collector having opposed, substantially parallel first and second main surfaces bounded by at least one edge surface;
   b. a reflective face located in contact with said first main surface of said photoluminescent collector but separated therefrom by the normal roughness of said reflective face to provide an air gap; and
   c. means optically coupled to said edge surface for converting light received from said edge surface into electric power.

3. A light collector and concentrator as in claim 2, wherein said means for converting light into electric power is comprised of photovoltaic solar cells.

4. A light powered electric apparatus comprising:
   a. an electrically powered device;
   b. a light collector and concentrator including a photoluminescent collector having opposed first and second main surfaces bounded by at least one edge surface and a reflective face located in contact with said first main surface but separated therefrom by the normal roughness of said reflective face to provide an air gap;
   c. means optically coupled to said edge surface for converting light received from said edge surface into electric power;
   d. means for attaching said light collector and concentrator to said electric device; and
   e. means for electrically interconnecting said light converting means to said electric device.

5. A light powered electric apparatus as in claim 4, wherein said means for attaching said collector to said electric device is comprised of a folder, said folder being operable to turn said device on when opened, and off when closed.

6. A light powered electric apparatus as in claim 4, wherein said means for interconnecting said light converting means to said electric device is comprised of an electrically conductive strip, said strip being capable of being bent or folded without being damaged.

7. A light powered electric apparatus as in claim 4, wherein said electric device is an electronic calculator.

8. A light powered electric apparatus as in claim 4, wherein said electric device is an electronic clock.

* * * * *